United States Patent
Amat et al.

(10) Patent No.: US 12,187,413 B2
(45) Date of Patent: Jan. 7, 2025

(54) PROPELLER BLADE

(71) Applicant: Ratier-Figeac SAS, Figeac (FR)

(72) Inventors: Pascal Amat, Figeac (FR); Olivier Picot, Saint Géry (FR)

(73) Assignee: RATIER-FIGEAC SAS, Figeac (FR)

( * ) Notice: Subject to any disclaimer, the term of this patent is extended or adjusted under 35 U.S.C. 154(b) by 0 days.

(21) Appl. No.: 18/364,188

(22) Filed: Aug. 2, 2023

(65) Prior Publication Data

US 2024/0109645 A1 Apr. 4, 2024

(30) Foreign Application Priority Data

Oct. 3, 2022 (EP) ..................................... 22306464

(51) Int. Cl.
*B29C 59/16* (2006.01)
*B29C 70/24* (2006.01)
*B64C 11/26* (2006.01)
*B29K 105/08* (2006.01)
*B29L 31/08* (2006.01)

(52) U.S. Cl.
CPC ............... *B64C 11/26* (2013.01); *B29C 59/16* (2013.01); *B29C 70/24* (2013.01); *B29K 2105/0845* (2013.01); *B29L 2031/087* (2013.01)

(58) Field of Classification Search
CPC ......... B64C 11/26; B29C 70/24; B29C 59/16; B29K 2105/0845; B29L 2031/087
See application file for complete search history.

(56) References Cited

U.S. PATENT DOCUMENTS

| 6,436,507 | B1 * | 8/2002 | Pannell | B29C 66/474 |
| | | | | 428/102 |
| 6,645,610 | B1 * | 11/2003 | Reis | B29C 70/54 |
| | | | | 428/92 |
| 8,859,083 | B2 | 10/2014 | Goering | |
| 9,248,612 | B2 | 2/2016 | Zhu et al. | |
| 10,407,159 | B2 | 9/2019 | Amat | |
| 10,618,631 | B2 | 4/2020 | Amat | |
| 11,085,456 | B2 | 8/2021 | Foster et al. | |

(Continued)

FOREIGN PATENT DOCUMENTS

| CN | 108045559 A | * | 5/2018 | ............. B64C 11/06 |
| EP | 3257743 A1 | | 12/2017 | |

(Continued)

OTHER PUBLICATIONS

Abstract for CN108045559, Published: May 18, 2018, 1 page.
European Search Report for Application No. 22306464.3, mailed Mar. 28, 2023, 10 pages.

*Primary Examiner* — David E Sosnowski
*Assistant Examiner* — Theodore C Ribadeneyra
(74) *Attorney, Agent, or Firm* — CANTOR COLBURN LLP

(57) ABSTRACT

A propeller blade comprising a composite member. The composite member comprises a stack of plies and a matrix in which the stack of plies is embedded. At least one ply comprises a plurality of first yarns aligned in a first direction defining a plane of the ply and a plurality of second yarns extending transverse to the plane of the ply. Each second yarn does not extend through more than one ply. Also provided is a propelling system comprising the propeller blade, a composite propeller blade prepreg, and a method of forming a propeller blade.

15 Claims, 5 Drawing Sheets

(56) References Cited

U.S. PATENT DOCUMENTS

| | | | |
|---|---|---|---|
| 2004/0071870 A1* | 4/2004 | Knowles | H01L 23/4275 257/E23.101 |
| 2008/0160248 A1* | 7/2008 | Jacobsen | B29C 70/54 428/113 |
| 2008/0286564 A1* | 11/2008 | Tsotsis | B29C 70/48 156/278 |
| 2010/0227112 A1 | 9/2010 | Han | |
| 2013/0028744 A1* | 1/2013 | Nordin | F15D 1/12 428/113 |
| 2020/0094442 A1* | 3/2020 | D'Alesio | B29B 15/127 |

FOREIGN PATENT DOCUMENTS

| | | | |
|---|---|---|---|
| EP | 3318483 A1 | 5/2018 | |
| EP | 3318484 B1 | 7/2020 | |
| EP | 3700740 A1 | 9/2020 | |
| GB | 2091633 A | 8/1982 | |
| GB | 2288441 A | 10/1995 | |
| WO | 02057067 A1 | 7/2002 | |
| WO | 2016003339 A1 | 1/2016 | |
| WO | 2016144629 A1 | 9/2016 | |
| WO | 2019081441 A1 | 5/2019 | |

* cited by examiner

PROPELLER BLADE

CROSS REFERENCE TO RELATED APPLICATION

This application claims priority to European Patent Application No. 22306464.3 filed Oct. 3, 2022, the entire contents of which is incorporated herein by reference.

TECHNICAL FIELD

The present invention relates to a propeller blade, propelling system, a composite propeller blade prepreg and methods of forming a propeller blade.

BACKGROUND

Propeller blades require high strength and low weight. In particular, it is desirable for the propeller blades to be sufficiently strong to withstand an impact, for example a bird strike. It is known to use composite materials, in particular carbon fibre composite materials in propeller blades.

SUMMARY

According to an aspect, there is provided a propeller blade comprising: a composite member comprising a stack of plies, at least one ply comprising: a plurality of first yarns aligned in a first direction defining a plane of the ply; and a plurality of second yarns extending transverse to the plane of the ply, wherein each second yarn does not extend through more than one ply; and a matrix in which the stack of plies is embedded.

Optionally, each of the plurality of second yarns has a length of between 50 and 200 microns.

Optionally, each of the plurality of second yarns extends beyond the ply by between 50 and 1000 microns. Optionally, each of the plurality of second yarns extends beyond the ply by between 50 and 200 microns. Optionally, each of the plurality of second yarns extends beyond the ply by between 100 and 200 microns.

Optionally, the plurality of second yarns extend from both sides of the ply.

Optionally, the plurality of second yarns extend perpendicular to the plane of the ply.

Optionally, the plurality of first yarns define a first ply layer and the plurality of second yarns extend through the first ply layer.

Optionally, the plurality of first yarns define a first ply layer and the plurality of second yarns extend through the thickness of the first ply layer.

Optionally, the plurality of second yarns protrude from the first ply layer.

Optionally, each ply of the composite member comprises a plurality of third yarns aligned in a second direction, the second direction being different to the first direction.

Optionally, the plurality of third yarns extend in the plane defined by the first direction.

Optionally, the plurality of third yarns are perpendicular with the plurality of first yarns.

Optionally, the plurality of third yarns are interlaced with the plurality of first yarns.

Optionally, each ply of the composite member comprises three or more plurality of yarns, each aligned in different directions, extending in the plane defined by the first direction.

Optionally, the three or more plurality of yarns are interlaced with each other.

Optionally, the at least one ply is a woven ply.

Optionally, the at least one ply is a braided ply.

Optionally, the plurality of second yarns is aligned perpendicular to the plane of the ply.

Optionally, the plurality of first yarns comprise carbon fibre.

Optionally, the plurality of second yarns comprise carbon fibre.

Optionally, one of the at least one plies comprising a plurality of second yarns extending transverse to the plane of the ply forms an outermost ply of the ply stack.

Optionally, the propeller blade comprises a second member disposed adjacent to the outermost ply of the ply stack.

Optionally, the second member comprises a textured surface.

Optionally, the plurality of second yarns interact with the textured surface.

Optionally, the plurality of second yarns interlock with the textured surface.

Optionally, the textured surface is textured on the micro scale. Optionally, the textured surface is textured on the nano scale. Optionally, the textured surface is textured on both the micro scale and the nano scale.

Optionally, the textured surface is defined by a plurality of formations, each formation having a maximum extent in the plane of the surface of less than 100 micrometres.

Optionally, the plurality of second yarns is joined to the second member by an adhesive.

Optionally, the second member is a non-composite member.

Optionally, the second member is a metallic member.

Optionally, the second member defines a blade root.

Optionally, the root overlaps the composite member along a partial axial extent of the blade.

Optionally, the second member is a second composite member.

Optionally, the second member is one of a foam insert, a glass ply, an aramid shell, an I-beam, or a metal sheath.

Optionally, the blade comprises a spar. Optionally, the composite member forms at least part of the spar.

Optionally, the spar comprises a core. Optionally, the composite member forms a shell around the core.

Optionally, the core comprises the second member.

Optionally, the core comprises a foam.

Optionally, the second member is a metallic leading edge member

Optionally, the propeller blade comprises a leading edge member defining at least part of a leading edge of the propeller blade. Optionally, the composite member defines the leading edge member.

Optionally, the leading edge member extends at least partially between a root of the propeller blade and a tip of the propeller blade.

Optionally, the leading edge member extends from a base end of the propeller blade to a tip of the propeller blade.

Optionally, the propeller blade comprises a leading edge insert. Optionally, the leading edge member overlays the leading edge insert.

Optionally, the first composite member defines a reinforcing layer.

According to an aspect, there is provided a propelling system comprising the propeller blade of the preceding aspect. The propelling system may be a gas turbine engine, an electric motor or a hybrid configuration combining both.

The propeller blade may comprise any of the previously mentioned optional features.

According to an aspect, there is provided a composite propeller blade prepreg comprising: a composite member comprising a stack of plies, at least one ply comprising: a plurality of first yarns aligned in a first direction defining a plane of the ply; and a plurality of second yarns extending transverse to the plane of the ply, wherein each second yarn does not extend through more than one ply; and a matrix in which the stack of plies is embedded.

According to an aspect, there is provided a method of forming a propeller blade comprising: providing a blade component; and applying a reinforcing layer to at least a portion of the blade component, the reinforcing layer being formed of a composite material comprising a plurality of plies, wherein at least one ply comprises: a plurality of first yarns aligned in a first direction defining a plane of the ply; and a plurality of second yarns extending transverse to the plane of the ply, wherein each second yarn does not extend through more than one ply.

Optionally, the plurality of first yarns and/or the plurality of second yarns comprises carbon fibre.

Optionally, the blade component is formed of a composite material.

Optionally, the blade component and the reinforcing layer are pre-pregs and the method further comprises curing the blade component and the reinforcing layer.

Optionally, the method further comprises applying a matrix material to the blade component and the reinforcing layer and curing the blade component and the reinforcing layer.

Optionally, the plurality of second yarns is aligned perpendicular to the plane.

Optionally, each layer of the reinforcing layer comprises a plurality of third yarns aligned in a second direction, the first and second directions defining the plane.

Optionally, the second direction is perpendicular to the first direction.

Optionally, the pluralities of first and third yarns are interwoven.

Optionally, the plurality of second yarns extends through the plane.

Optionally, the plurality of second yarns extends between the pluralities of first and third yarns.

Optionally, each of the plurality of second yarns has a length of between 50 and 200 microns.

Optionally, each of the plurality of second yarns extends beyond the ply by between 50 and 1000 microns. Optionally, each of the plurality of second yarns extends beyond the ply by between 50 and 200 microns. Optionally, each of the plurality of second yarns extends beyond the ply by between 100 and 200 microns.

Optionally, the plurality of second yarns extend from both sides of the ply.

The propeller blade may comprise any of the previously mentioned optional features.

According to an aspect, there is provided a method of forming a propeller blade comprising: texturing a surface of a metal root; and applying a joining layer of a composite material to the textured surface, wherein the joining layer comprises a stack of plies, at least one ply comprising: a plurality of first yarns aligned in a first direction defining a plane of the ply; and a plurality of second yarns extending transverse to the plane of the ply, wherein each second yarn does not extend through more than one ply and wherein the plurality of second yarns contacts the textured surface.

The method may further comprise applying adhesive between the joining layer and the root.

The method may further comprise applying one or more further layers of composite material to the joining layer to form a structural spar.

Optionally, texturing the surface comprises texturing on a nano scale. Optionally, texturing the surface comprises texturing on a micro scale. Optionally, texturing the surface comprises texturing on both a nano scale and a micro scale.

Optionally, texturing the surface comprises laser ablation.

Optionally, the first and/or second yarns comprise carbon fibre.

Optionally, the joining layer is a pre-preg and the method further comprises curing the joining layer.

Optionally, the method further comprises applying a matrix material to the joining layer and curing the joining layer.

Optionally, the plurality of second yarns extend perpendicular to the plane of the ply.

Optionally, the plurality of first yarns define a first ply layer and the plurality of second yarns extend through the first ply layer.

Optionally, the plurality of second yarns protrude from the first ply layer.

Optionally, each ply of the joining layer comprises a plurality of third carbon fibre yarns aligned in a second direction, the first and second directions defining the plane.

Optionally, the second direction is perpendicular to the first direction.

Optionally, the first and third plurality of carbon fibre yarns are interlaced.

Optionally, the at least one ply is a woven ply.

Optionally, the at least one ply is a braided ply.

Optionally, the plurality of second yarns extends between the first and third yarns.

Optionally, each of the plurality of second yarns has a length of between 50 and 200 microns.

Optionally, each of the plurality of second yarns extends beyond the ply by between 50 and 1000 microns. Optionally, each of the plurality of second yarns extends beyond the ply by between 50 and 200 microns. Optionally, each of the plurality of second yarns extends beyond the ply by between 100 and 200 microns.

The propeller blade may comprise any of the previously mentioned optional features.

BRIEF DESCRIPTION OF THE DRAWINGS

Embodiments will now be described, by way of example only, and with reference to the accompanying drawings in which.

DETAILED DESCRIPTION

Figure 1:
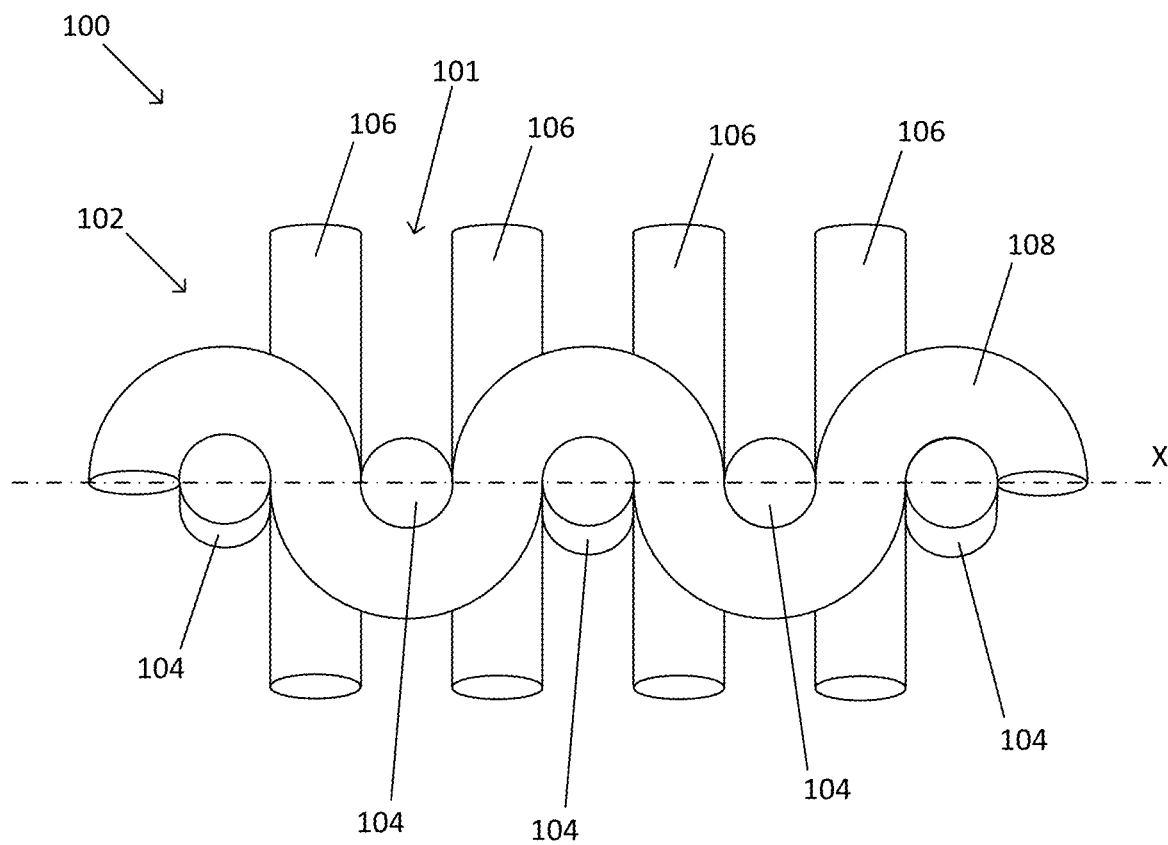
FIG. 1 shows a schematic cross-sectional view of a ply of a composite material.
Figure 4:
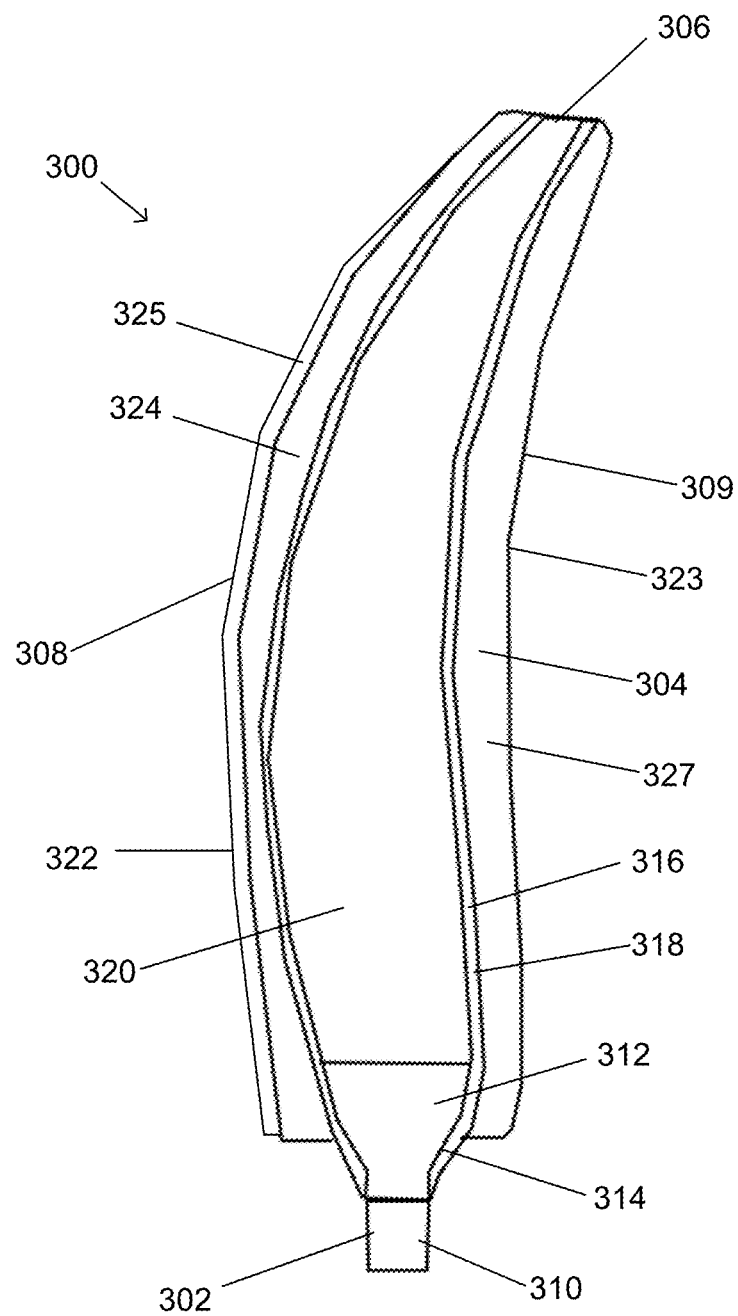
FIG. 4 shows a schematic cross-sectional view of a propeller blade.

A propeller blade 300 as shown in FIG. 4 includes a composite material 100 as shown in FIG. 1. The propeller blade 300 comprises composite materials and non-composite materials. The non-composite components may be omitted. The propeller blade 300 comprises a root 302 and a tip 306. The blade 300 defines a leading edge 308 and a trailing edge 309. A body 304 extends between the leading edge 308 and the trailing edge 309. The leading edge 308 is the portion of the blade 300 which is foremost in the direction of travel of the blade 300 in use. The trailing edge 309 is the edge which is aftmost in the direction of travel of the blade 300 in use. The propeller blade 300 is suitable for use in a propelling system such as a gas turbine engine, an electric motor or a hybrid configuration combining both. The propeller blade 300 can be used on any kind of application with bladed rotors, including vertical take-off and landing systems, electric propulsion systems, and windmills.

In broad outline, with reference to FIG. 1, the composite material 100 comprises a stack of plies 102. Each ply 102 comprises a plurality of yarns. The yarns are carbon fibres. In embodiments, the yarns are a different material. Each ply 102 comprises a single layer. The material 100 comprises a plurality of yarns which extend transverse to the plies 102. The transverse yarns do not extend through more than one ply 102. That is, they are discrete to the plies 102. In embodiments, the transverse yarns extend to adjacent plies. The transverse yarns provide improved interlaminar shear strength to the composite material and can form a stronger joint with another element. This is because the transverse yarns may interact with adjacent plies or with a surface to which the composite material is bonded. In embodiments, the transverse yarns of adjacent plies may interlock.

The composite material 100 further comprises a matrix 101, in which the stack of plies 102 is embedded. In embodiments, the matrix is a polymer matrix. The polymer may comprise, for example, an epoxy, a vinyl ester, a polyester thermosetting plastic or a phenol formaldehyde resin. The matrix may comprise a thermoplastic matrix such as polyaryletherketone (PAEK). The matrix may comprise a thermoplastic matrix such as polyether ether ketone (PEEK), polyphenylene sulphide, polyamide or a reactive thermoplastic such as acrylic based resin. The matrix may be any suitable material.

Figure 2:
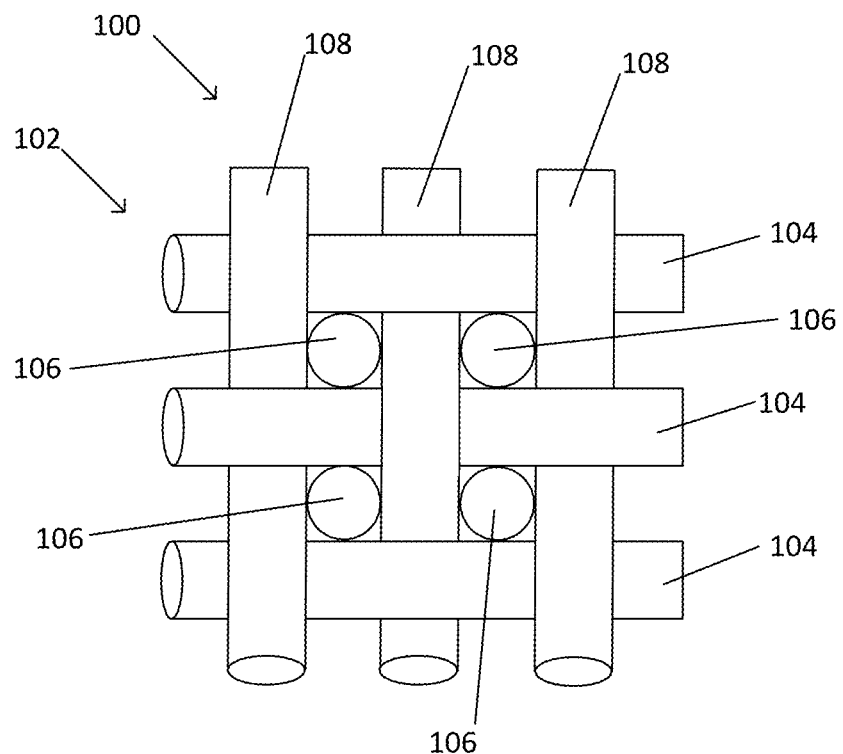
FIG. 2 shows a schematic plan view of part of the ply of FIG. 1.

FIG. 1 shows a schematic cross-sectional view of one ply 102 of a composite material 100. The composite material 100 comprises a stack of plies 102. In FIG. 1, only a small section of one ply 102 is shown. Each ply may be considered a substantially planar sheet of material. In embodiments, the composite material 100 may comprise only a single ply. FIG. 2 shows a schematic plan view of part of the ply 102 of FIG. 1.

The ply 102 comprises a plurality of first yarns 104. The first yarns 104 are carbon fibre yarns. In embodiments, the yarns may be any other suitable material, such as glass fibres, aramid fibres, or natural fibres such as flax or hemp or a mixture of such materials.

The plurality of first yarns 104 is aligned in a first direction. In FIG. 1, the first direction is into the plane of the page as viewed. Each of the first yarns 104 is parallel to each other of the first yarns 104. The plurality of first yarns 104 defines a plane of the ply 102. The plane is viewed in cross section in FIG. 1 and is indicated by line X. In FIG. 2, the plane is coincident with the plane of the page. In this embodiment, the ply 102 comprises one layer. The plies are stacked in a direction perpendicular to the plane of the ply 102.

The ply 102 further comprises a plurality of second yarns 106. The second yarns 106 are carbon fibre yarns. In embodiments, the yarns may be any other suitable material, such as glass or aramid fibres or natural fibres such as flax or hemp, or a mixture of such materials.

The plurality of second yarns 106 extend transverse to the plane of the ply 102. Each of the second yarns 106 is parallel to each other of the second yarns 106. Each of the second yarns 106 is transverse to the plane of the ply 102. In this embodiment, the plurality of second yarns 106 is aligned perpendicular to the plane of the ply 102. In other embodiments, the plurality of second yarns 106 is not aligned perpendicular to the plane of the ply 102. For example, the plurality of second yarns 106 may be aligned at 45 degrees to the plane of the ply 102, or any other suitable angle. Each second yarn 106 does not extend through more than one ply 102. The plurality of second yarns 106 extends perpendicular to the plane of the ply 102. The plurality of second yarns 106 extend through the first ply layer. The plurality of second yarns 106 extend through the thickness of the first ply layer. The plurality of second yarns 106 protrude from the first ply layer. Each of the plurality of second yarns 106 has a length of between 0.05 and 0.2 mm. Each of the plurality of second yarns extends beyond the ply 102 by between 50 and 1000 microns. In embodiments, each of the plurality of second yarns extends beyond the ply 102 by between 50 and 200 microns. In embodiments, each of the plurality of second yarns extends beyond the ply 102 by between 100 and 200 microns. The plurality of second yarns 106 protrudes from both sides of the first ply layer. In embodiments, the plurality of second yarns 106 protrudes from both sides of the first ply layer by an equal amount.

The second yarns 106 increase the interlaminar shear strength and damage tolerance of the composite material 100.

Each ply further comprises a plurality of third yarns 108. The third yarns 108 are carbon fibre yarns. In embodiments, the yarns may be any other suitable material, such as glass or aramid fibres, or natural fibres such as flax or hemp or a mixture of such materials. The plurality of third yarns 108 is interlaced with the plurality of first yarns 104. The ply 102 is therefore a woven ply. This improves the strength of the ply 102. The plurality of third yarns 108 and the plurality of first yarns 104 together define the first ply layer. The plurality of third yarns 108 extends in a direction substantially perpendicular to the direction of the plurality of first yarns 104. In other embodiments, the plurality of third yarns 108 extends at any other suitable angle to the plurality of first yarns 104, for example 45 degrees. The first and third yarns 104, 108 define the ply layer.

In embodiments, every ply 102 of the composite material 100 comprises a plurality of second yarns 106 extending transverse to the plane of the ply 102. In other embodiments, only a subset of the plies 102 of the composite material 100 comprises a plurality of second yarns 106 extending transverse to the plane of the ply 102. In such embodiments, one of the one plies 102 comprising a plurality of second yarns 106 extending transverse to the plane of the ply 102 forms an outermost ply of the ply stack. This allows the second yarns 106 to be exposed to an exterior of the composite material 100 for bonding to another element. The plurality of second plies 106 improve the strength of such a bond by locating in a surface roughness of the other element. The plurality of second plies 106 may be bonded to another element in an end-on arrangement. In embodiments, only a single ply 102 of the composite material 100 comprises a plurality of second yarns 106 extending transverse to the plane of the ply 102.

Figure 3:
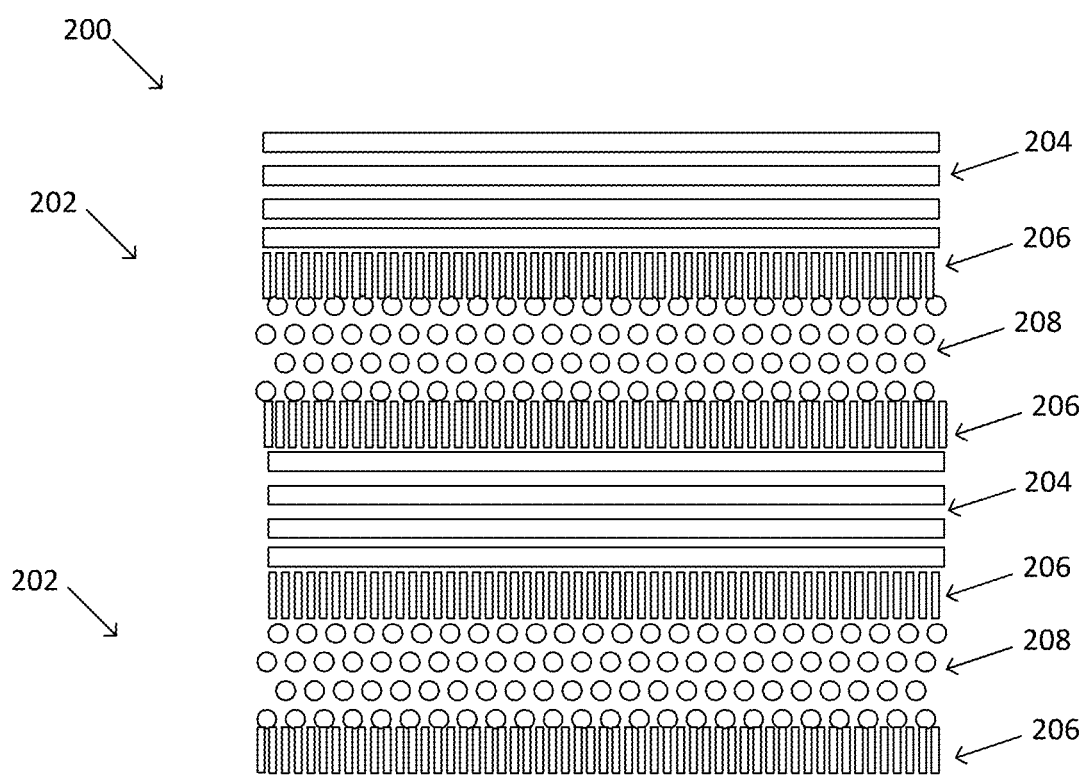
FIG. 3 shows a schematic cross-sectional view of a composite material.

FIG. 3 shows a schematic cross-sectional view of a ply 202 of another composite material 200. The composite material 200 comprises a stack of plies 202. In FIG. 3, only a small section of two plies 202 is shown. Each ply 202 may be considered a substantially planar sheet of material. In embodiments, the composite material 200 may comprise only a single ply 202. The description will proceed by reference to a single ply 202 for brevity, but it will be understood that the other plies 202 may be similar.

The ply 202 comprises a plurality of first yarns 204. The first yarns 204 are carbon fibre yarns. In embodiments, the yarns may be any other suitable material, such as glass fibres or aramid fibres, or natural fibres such as flax or hemp or a mixture of such materials. The plurality of first yarns 204 is aligned in a first direction. Each of the first yarns 204 is parallel to each other of the first yarns 204. The plurality of first yarns 204 defines a plane of the ply 202. The plane is viewed in cross section in FIG. 3. The plurality of first yarns 204 define a first ply layer. In this embodiment, the ply 202 comprises four layers.

The ply 202 further comprises a plurality of second yarns 206. The second yarns 206 are carbon fibre yarns. In embodiments, the yarns may be any other suitable material, such as glass or aramid fibres, or a mixture of such materials. The plurality of second yarns 206 extend transverse to the plane of the ply 202. Each of the second yarns 206 is parallel to each other of the second yarns 206. Each of the second yarns 206 is transverse to the plane of the ply 202. In this embodiment, the plurality of second yarns 206 is aligned perpendicular to the plane of the ply 202. In other embodiments, the plurality of second yarns 206 is not perpendicular to the plane of the ply 202. For example, the plurality of second yarns 206 may be aligned at 45 degrees to the plane of the ply 202. Each second yarn 206 does not extend through more than one ply 202. Each of the plurality of second yarns 206 has a length of between 0.05 and 0.2 mm Each of the plurality of second yarns 206 extends beyond the ply 202 by between 50 and 1000 microns. In embodiments, each of the plurality of second yarns 206 extends beyond the ply 202 by between 50 and 200 microns. In embodiments, each of the plurality of second yarns 206 extends beyond the ply 202 by between 100 and 200 microns. The plurality of second yarns 206 are formed by a plurality of milled fibres. The milled fibres extend into the plane of the ply 202. The plurality of second yarns 206 comprises a smaller thickness than the plurality of first yarns 206.

The second yarns 206 increase the interlaminar shear strength and damage tolerance of the composite material 200.

The plurality of second yarns 206 defines a second layer of the ply 202 and a fourth layer of the ply 202. The plurality of second yarns 206 extends between adjacent layers of the ply 202. The plurality of second yarns 206 extends between adjacent plies of the composite material 200.

The ply 202 further comprises a plurality of third yarns 208. The third yarns 208 are carbon fibre yarns. In embodiments, the yarns may be any other suitable material, such as glass or aramid fibres, or a mixture of such materials. The plurality of third yarns 208 is aligned in a second direction. The second direction is different to the first direction and within the plane of the ply 202. The first yarns 204 and second yarns 208 therefore define the plane of the ply 202. The plurality of third yarns 208 extends in a direction perpendicular to the direction of the plurality of first yarns 204 Each of the third yarns 208 is parallel to each other of the third yarns 208.

The plurality of third yarns 208 defines a third layer of the ply 202. The ply 202 therefore comprises a stack of layers. The layers comprise, in order, a first layer of first yarns 204, a second layer of second yarns 206, a third layer of third yarns 208 and a fourth layer of second yarns 206. The second yarns 206 therefore extend between layers of the ply 202. The second yarns 206 extend between the plurality of first yarns 204 and the plurality of third yarns 208.

In embodiments, every ply 202 of the composite material 200 comprises a plurality of second yarns 206 extending transverse to the plane of the ply 202. In other embodiments, only a subset of the plies 202 of the composite material 200 comprises a plurality of second yarns 206 extending transverse to the plane of the ply 202. In such embodiments, one of the plies 202 comprising a plurality of second yarns 206 extending transverse to the plane of the ply 202 forms an outermost ply of the ply stack. This allows the second yarns 206 to be exposed to an exterior of the composite material 200 for bonding to another element. The plurality of second plies 206 improve the strength of such a bond by locating in a surface roughness of the other element. The plurality of second plies 206 may be bonded to another element in an end-on arrangement. In embodiments, only a single ply 202 of the composite material 200 comprises a plurality of second yarns 206 extending transverse to the plane of the ply 202.

FIG. 4 shows a schematic cross-sectional view of the propeller blade 300. The propeller blade 300 comprises the root 302. The root 302 defines a base end of the propeller blade 300. The propeller blade 300 comprises the body 304 extending from the root 302. The body 304 defines the tip 306 and the leading edge 308. The leading edge 308 is the edge which is foremost in the direction of travel of the blade 300 in use. The leading edge 308 is therefore required to be particularly strong as it is the most likely part of the blade to sustain an impact. The body 304 is profiled to provide an aerofoil. The propeller blade 300 forms part of a propelling system. In embodiments, the propelling system is a gas turbine engine, an electric motor or a hybrid configuration combining both.

In use, the root 302 joins the body 304 to a hub of the propelling system. The root 302 comprises a protruding feature 310 which is received in the hub. The root 302 comprises a locating feature 312 joined to the protruding feature 310. The locating feature 312 comprises an outer surface 314. The outer surface 314 is flared. The outer surface 314 comprises a textured surface. The textured surface is textured on the micro or nano scale. The textured surface is defined by a plurality of formations, each formation having a maximum extent in the plane of the surface of less than 100 micrometres. The scale of the texturing is selected to closely match the size of the second yarns to promote mechanical interaction. In embodiments, the textured surface is textured on both a nano scale and a micro scale. Texturing the surface on a nano scale increases the specific surface area of the surface. This improves the strength of the bond between the root and the composite material. Texturing the surface on a micro scale allows the plurality of second yarns to interact with the surface. This improves the strength of the bond between the root and the composite material.

The locating feature 312 is received in the body 304 of the blade 300. The locating feature 312 is joined to the body 304 of the blade 300.

The root 302 is a one-piece component. The root 302 is integrally formed. As used herein, one-piece component refers to a component which is not separable into two or more components following assembly. Integrally formed relates to two or more features that are formed into a one-piece component during a manufacturing stage of the component. The root 302 is a solid metal body. In this embodiment, the root 302 is formed of steel. In other embodiments, any other suitable material may be used.

The propeller blade 300 comprises a spar 316. The spar 316 is an elongate member. The spar 316 extends within the body 304. The spar 316 is joined to the root 302. The spar 316 extends from the root 302 to the tip 306 of the blade. In embodiments, the spar 316 does not extend fully to the tip 306. In embodiments, the spar 316 extends over more than 50%, more than 75% or more than 90% of the length of the body 304. The spar 316 provides rigidity and strength to the blade 300.

The spar 316 comprises a spar shell 318. The shell 318 is an elongate member. The spar shell 318 defines an exterior surface of the spar 316. The spar shell 318 is open at one end. The spar shell 318 surrounds a core 320. The core 320 comprises a foam. In embodiments, the foam comprises a polymer foam such as polyurethane, polyvinyl chloride, polymethacrylamide, epoxy or polyethylene terephthalate. Other suitable foam materials may be used. The spar shell 318 is formed of a composite material. The composite material comprises a stack of plies. At least one ply comprises: a plurality of first yarns aligned in a first direction defining a plane of the ply; and a plurality of second yarns extending transverse to the plane of the ply, wherein each second yarn does not extend through more than one ply; and a matrix in which the stack of plies is embedded. The composite material may comprise the composite material 100 of FIG. 1 or the composite material 200 of FIG. 3.

The spar shell 318 is joined to the locating feature 312 of the root 302. The locating feature 312 of the root 302 is received within the hollow interior of the spar shell 318. The root 302 overlaps the shell 318 along a partial axial extent of the blade 300. The root 302 is received in the open end of the spar shell 318.

An inner surface of the spar shell 318 abuts the outer surface 314 of the locating feature 312. The spar shell 318 conforms to the flared outer surface 314. An outermost ply of the ply stack of the composite material of the spar shell 318 contacts the outer surface 314 of the locating feature 312. In relation to the outermost ply, the term 'outermost' will be understood to mean a ply which defines a surface of the shell 318. That is, a ply which is not stacked between two other plies. The outermost ply is the at least one ply comprising a plurality of second yarns extending transverse to the plane of the ply. In embodiments, the outermost ply is the ply 100 of FIGS. 1 and 2 or one of the plies 200 of FIG. 3. The plurality of second yarns interact with the textured surface 314. The plurality of second yarns interlock with the textured surface 314. An adhesive bonds the plurality of second yarns to the textured surface 314. The interaction of the second yarns with the textured surface provides a strong joint between the root 302 and the spar 316 without the need for other joining techniques. This allows a more efficient manufacturing process and greater design freedom in the form of the propeller blade 300.

A similar improved bonding effect may be obtained between the shell 318 and other components of the blade 300. The improved bonding effect may be obtained between the spar shell 318 and composite components of the blade 300 and/or non-composite components of the blade 300. For example, between the spar shell 318 and one or more of the core 320, an aramid shell of the blade 300, a glass ply of the blade 300 or an I-beam of the blade 300.

Figure 5:
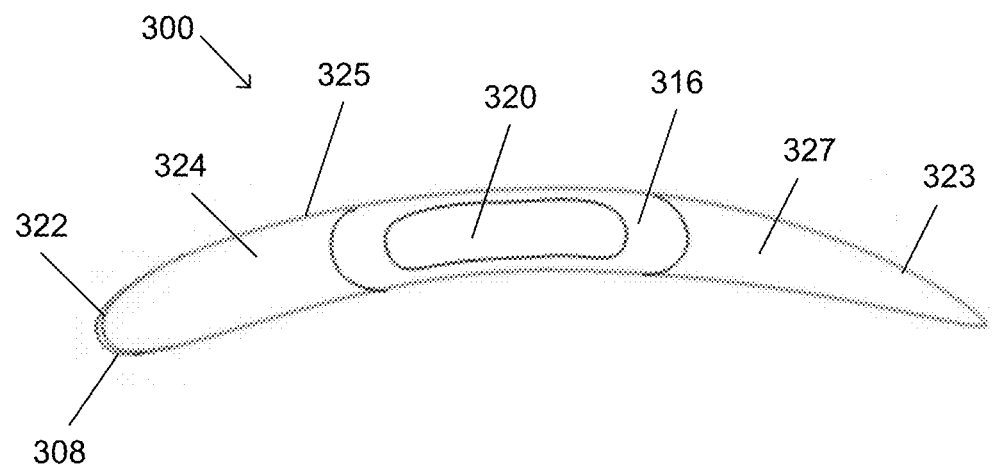
FIG. 5 shows a schematic cross-sectional view of a propeller blade.

As shown in FIG. 5, the propeller blade 300 comprises the spar 316 with core 320. A leading edge insert 324 is disposed forward of the spar in the leading edge direction. A trailing edge insert 327 is disposed rearwards of the spar in the trailing edge direction. An outer shell 325 defines part or all of the periphery of the propeller blade 300. The outer shell 325 surrounds the spar 316, leading edge insert 324 and trailing edge insert 327. The outer shell 325 is a composite shell. The outer shell 325 comprises a plurality of plies and a matrix in which the plies are embedded.

The propeller blade 300 comprises a leading edge member 322. The leading edge member 322 is formed of a composite material. The leading edge member 322 comprises a portion of the outer shell 325 of the propeller blade 300. The leading edge member 322 defines at least part of the leading edge 308. In embodiments, the leading edge member 322 defines the entire leading edge 308.

The leading edge member 322 is integrally formed with the outer shell 325. The leading edge member 322 comprises at least one ply comprising: a plurality of first yarns aligned in a first direction defining a plane of the ply; and a plurality of second yarns extending transverse to the plane of the ply, wherein each second yarn does not extend through more than one ply; and a matrix in which the stack of plies is embedded. The composite material may comprise the composite material 100 of FIG. 1 or the composite material 200 of FIG. 3.

The second yarns provide improved interlaminar shear strength to the composite material. This makes the leading edge member 322 better able to withstand an impact such as a bird strike or gunshot. In turn, this may obviate the need for a metallic leading edge member, allowing a simpler manufacturing process, lower weight and greater design freedom. The leading edge member 322 is also capable of bonding more strongly within or with the outer shell 325, due to the plurality of second yarns as previously discussed.

The leading edge member 322 comprises, in embodiments, the outermost ply of the ply stack of the composite material of the outer shell 325 at the leading edge 308. In relation to the outermost ply, the term 'outermost' will be understood to mean a ply which defines a surface of the outer shell 325. That is, a ply which is not stacked between two other plies.

In other embodiments, the leading edge member 322 is a member overlaid on the outer surface of the outer shell 325. Such an embodiment comprises at least one ply comprising: a plurality of first yarns aligned in a first direction defining a plane of the ply; and a plurality of second yarns extending transverse to the plane of the ply, wherein each second yarn does not extend through more than one ply; and a matrix in which the stack of plies is embedded. The composite material may comprise the composite material 100 of FIG. 1 or the composite material 200 of FIG. 3. Such arrangements in the leading-edge area help to strengthen the interface at the bonded leading edge.

The propeller blade 300 comprises a trailing edge member 323. The trailing edge member 323 comprises a portion of the outer shell 325 of the propeller blade 300. The trailing edge member 323 defines at least part of the trailing edge. In embodiments, the trailing edge member 323 has a configuration corresponding to the leading edge member 322 as described above.

The provision of the leading edge member 322 and/or the trailing edge member 323 having one of the arrangements described above helps to provide impact protection, aid aerodynamics and aid manufacturing processes.

The trailing edge member 323 defines at least part of the trailing edge 309.

The leading edge insert 324 is enclosed within the leading edge member 322. The trailing edge insert 327 is enclosed within the trailing edge member 323. The leading edge member 322 overlies the leading edge insert 324. The trailing edge member 323 overlies the trailing edge insert 327. The leading edge insert 324 and trailing edge insert 327 comprise a foam. In embodiments, the foam comprises a polymer foam such as polyurethane, polyvinyl chloride, polymethacrylamide, epoxy or polyethylene terephthalate. Other suitable foam materials may be used. The leading edge member 322 provides a reinforcing layer of the blade 300.

Figure 6:
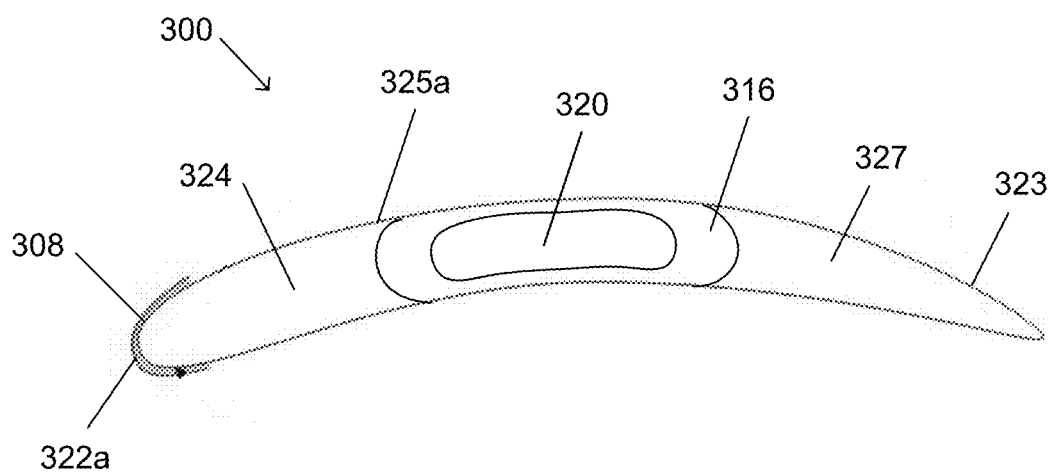
FIG. 6 shows a schematic cross-sectional view of another propeller blade.

FIG. 6 shows a schematic cross-sectional view of another propeller blade 300. The propeller blade 300 is similar to the propeller blade 300 of FIGS. 4 and 5 and like reference numerals have been used. The propeller blade 300 comprises the spar 316 with core 320. A leading edge insert 324 is disposed forward of the spar in the leading edge direction. A trailing edge insert 327 is disposed rearwards of the spar in the trailing edge direction. An outer shell 325 defines part or all of the periphery of the propeller blade 300. The outer shell 325 surrounds the spar 316, leading edge insert 324 and trailing edge insert 327. The outer shell 325 is a composite shell. The outer shell 325 comprises a plurality of plies and a matrix in which the plies are embedded.

The propeller blade 300 comprises a leading edge member 322a. The leading edge member 322a is formed of a non-composite material. In embodiments, the leading edge member 322a may be formed from a metallic material, such as nickel, stainless steel or titanium. The leading edge member 322a comprises a textured surface. The textured surface is an inner surface of the leading edge member 322a. The textured surface is textured on the micro or nano scale. The textured surface is defined by a plurality of formations, each formation having a maximum extent in the plane of the surface of less than 100 micrometres. In embodiments, the textured surface of the leading edge member 322a may be bonded to a composite component of the blade 300.

The leading edge member 322a is a member overlaid on the outer shell 325. In this embodiment, the leading edge member 322a is bonded with the outer shell 325a, acting as a composite component.

An outer surface of the outer shell 325 abuts the leading edge member 322a. The outer surface of the outer shell 325 conforms with a corresponding surface of the leading edge member 322a. An outermost ply of the ply stack of the composite material of the outer shell 325 contacts the textured surface of the leading edge member 322a. In relation to the outermost ply, the term 'outermost' will be understood to mean a ply which defines a surface of the outer shell 325. That is, a ply which is not stacked between two other plies. The outermost ply is the at least one ply comprising a plurality of second yarns extending transverse to the plane of the ply. In embodiments, the outermost ply is the ply 100 of FIGS. 1 and 2 or one of the plies 200 of FIG. 3. The plurality of second yarns interact with the textured surface of leading edge member 322a. The plurality of second yarns interlock with the textured surface 314. An adhesive bonds the plurality of second yarns to the textured surface 314. The interaction of the second yarns with the textured surface provides a strong joint between the outer shell 325 and the leading edge member 322a without the need for other joining techniques. This allows a more efficient manufacturing process and greater design freedom in the form of the propeller blade 300.

The outer shell 325, forming a composite component of the blade, comprises the composite material 100 of FIGS. 1 and 2 or the composite material 200 of FIG. 3. This helps to provide a stronger bond between the leading edge member 322a and the composite component as described above in relation to the root 302. In turn, this aids the strength of the blade 300. In embodiments, the textured surface is textured on both a nano scale and a micro scale. Texturing the surface on a nano scale increases the specific surface area of the surface. This improves the strength of the bond between the leading edge member and the composite component. Texturing the surface on a micro scale allows the plurality of second yarns to interact with the surface. This improves the strength of the bond between the leading edge member and the composite component.

It is envisaged that a composite material comprising a plurality of second yarns extending transverse to the plane of a ply, such as the composite materials 100 and 200 of FIGS. 1, 2 and 3, may be utilised in numerous other ways in the propeller blade 300. For example, the propeller blade may comprise a reinforcing layer comprising such a material. The reinforcing layer may be internal to the blade or may form at least part of an outer surface of the blade. The reinforcing layer may define the entire outer surface of the body 304. The use of such composite materials in the blade 300 provides improved interlaminar shear strength, leading to improved strength of the blade 300 and/or lower weight compared to blades of similar strength. Such composite materials further provide improved joint strength, due to interaction between the second yarns and other components of the blade 300. This may obviate the need for other joining techniques such as stitching. In turn, this improves design freedom, as joining techniques such as stitching are not suitable for joining certain components, for example metal components or components which are too thick to be effectively stitched together. Further, such composite materials may be easily shaped during manufacturing to provide or conform to a desired shape of the blade 300.

The composite material may be provided as part of a composite propeller blade prepreg. The shell 318 or leading edge member 322 may be provided as part of a composite propeller blade prepreg. In embodiments, the composite material is provided as a pre-preg. The pre-preg in embodiments is a thermoplastic pre-preg. In embodiments, the pre-preg is a thermoset pre-preg. In embodiments, the composite material is formed by a dry ply to which a matrix material is applied.

Also disclosed is a method of forming a propeller blade 300. The method may be used to form the propeller blade 300 of FIG. 4 or the propeller blade 300 of FIG. 5. The method comprises: providing a blade component; and applying a reinforcing layer to at least a portion of the blade component, the reinforcing layer being formed of a composite material comprising a plurality of plies, wherein at least one ply comprises: a plurality of first yarns aligned in a first direction defining a plane of the ply; and a plurality of second yarns extending transverse to the plane of the ply, wherein each second yarn does not extend through more than one ply. The composite material may be the composite material 100 or 200 of FIGS. 1, 2 and 3. The blade component may be formed of a composite material.

In such embodiments, the method further comprises curing the blade component and the reinforcing layer.

In other embodiments, the method further comprises applying a matrix material to the blade component and the reinforcing layer and curing the blade component and the reinforcing layer. In such embodiments, the matrix material may be applied to the entire reinforcing layer. That is, a single matrix material may be applied to the entire reinforcing layer. The matrix material may act as an adhesive between the reinforcing layer and the blade component.

Joining the reinforcing layer to the blade component may therefore be achieved as a one-step process, as a separate adhesive application or additional matrix material application is not needed.

Also disclosed is a further method of forming a propeller blade 300. The method may be used to form the propeller blade 300 of FIG. 4 or the propeller blade 300 of FIG. 5. The method comprises: texturing a surface of a non-composite component; and applying a joining layer of a composite material to the textured surface, wherein the joining layer comprises a stack of plies, at least one ply comprising: a plurality of first yarns aligned in a first direction defining a plane of the ply; and a plurality of second yarns extending transverse to the plane of the ply, wherein each second yarn does not extend through more than one ply and wherein the plurality of second yarns contacts the textured surface.

In embodiments, the non-composite component is a metal root. In embodiments, the metal root is the root 302. In embodiments, the composite material is the composite material 100 or 200 of FIGS. 1, 2 and 3. In embodiments, the non-composite component is the leading edge member 322a of FIG. 6. In embodiments, the leading edge member is a metal sheath, for example nickel, stainless steel, or titanium.

In embodiments, the method further comprises applying adhesive between the joining layer and the root 302. In embodiments, the method further comprises applying a matrix material to the joining layer. In embodiments, the matrix material is a polymer. The polymer may comprise, for example, an epoxy, a vinyl ester, a polyester thermosetting plastic or a phenol formaldehyde resin. The matrix may comprise a thermoplastic matrix such as polyaryletherketone (PAEK). The matrix may comprise a thermoplastic matrix such as polyether ether ketone (PEEK), polyphenylene sulphide, polyamide or a reactive thermoplastic such as acrylic based resin. The matrix material may be any suitable material. In embodiments, the matrix material acts as an adhesive between the joining layer and the non-composite component. In such embodiments, the matrix material may be applied to the entire joining layer. That is, a single matrix material may be applied to the entire joining layer. Joining the joining layer to the non-composite component may therefore be achieved as a one-step process, as a separate adhesive application or additional matrix material application is not needed.

In embodiments, the method further comprises applying one or more further layers of composite material to the joining layer. In embodiments, the method further comprises applying one or more further layers of composite material to the joining layer to form a structural spar. The structural spar may be the spar 316. In embodiments, the further layers of composite material are further layers of the composite material 100 or 200 of FIGS. 1, 2 and 3. In other embodiments, another suitable composite material may be used.

The texturing the surface comprises texturing on a nano or micro scale. The texturing the surface comprises laser ablation. In embodiments, the texturing the surface comprises texturing the surface on both a nano scale and a micro scale. Texturing the surface on a nano scale increases the specific surface area of the surface. This improves the strength of the bond between the non-composite component and the joining layer. Texturing the surface on a micro scale allows the plurality of second yarns to interact with the surface. This improves the strength of the bond between the non-composite component and the joining layer.

In embodiments, the joining layer is a pre-preg and the method further comprises curing the joining layer. In such embodiments, the joining layer comprises a matrix material and the matrix material may act as an adhesive between the joining layer and the non-composite component. In embodiments, the method further comprises curing the joining layer.

The various embodiments described herein are presented only to assist in understanding and teaching the claimed features. These embodiments are provided as a representative sample of embodiments only and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilised and modifications may be made without departing from the scope of the claimed invention. Various embodiments of the invention may suitably comprise, consist of, or consist essentially of, appropriate combinations of the disclosed elements, components, features, parts, steps, means, etc, other than those specifically described herein. In addition, this disclosure may include other inventions not presently claimed, but which may be claimed in future.

The invention claimed is:

1. A propeller blade comprising:
 a composite member comprising a stack of plies, at least one ply comprising:
  a plurality of first yarns aligned in a first direction defining a plane of the at least one ply; and
  a plurality of second yarns (106) extending transverse to the plane of the at least one ply; wherein each second yarn does not extend through more than one ply, wherein the second yarns pass though the plane of the at least one ply; and
 a matrix in which the stack of plies is embedded.

2. The propeller blade of claim 1, wherein each of the plurality of second yarns extends beyond the ply by between 50 and 1000 microns.

3. The propeller blade of claim 1, wherein one of the at least one plies includes a plurality of second yarns extending transverse to the plane of the ply forms an outermost ply of the ply stack;
 the blade further comprising:
 a second member disposed adjacent to the outermost ply of the stack of plies.

4. The propeller blade of claim 3, wherein the second member comprises a textured surface and wherein the plurality of second yarns interact with the textured surface.

5. The propeller blade of claim 4, wherein the textured surface is textured on at least one of the micro and nano scale.

6. The propeller blade of claim 3, wherein the plurality of second yarns is joined to the second member by an adhesive.

7. The propeller blade of claim 3, wherein the second member is a metallic blade root.

8. The propeller blade of claim 7, wherein the root and the composite member overlap along a partial axial extent of the blade.

9. The propeller blade of claim 3, wherein the second member is one of a foam insert, a glass ply, an aramid shell, an I-beam or a metal sheath.

10. The propeller blade of claim 1, further comprising:
 a spar, the composite member forming at least part of the spar.

11. The propeller blade of claim 3, wherein the second member is a metallic leading edge member.

12. The propeller blade of claim 1, further comprising:
a leading edge member defining at least part of a leading edge of the propeller blade and wherein the composite member defines the leading edge member.

13. The propeller blade of claim 12, wherein the leading edge member extends from a base end of the propeller blade to a tip of the propeller blade.

14. The propeller blade of claim 12, further comprising:
a leading edge insert, wherein the leading edge member overlays the leading edge insert.

15. A propelling system comprising:
a propeller blade of claim 1.

* * * * *